United States Patent
Miles et al.

(10) Patent No.: US 9,958,568 B2
(45) Date of Patent: May 1, 2018

(54) SYSTEMS AND METHODS FOR ACTIVE CANCELLATION OF TRANSIENT SIGNALS AND DYNAMIC LOOP CONFIGURATION

(71) Applicant: CGG Services SA, Massy (FR)

(72) Inventors: Philip Miles, Rockwood (FR); Jason Berringer, Rockwood (FR)

(73) Assignee: CGG SERVICES SAS, Massy (FR)

(*) Notice: Subject to any disclaimer, the term of this patent is extended or adjusted under 35 U.S.C. 154(b) by 192 days.

(21) Appl. No.: 14/817,772

(22) Filed: Aug. 4, 2015

(65) Prior Publication Data
US 2016/0041295 A1 Feb. 11, 2016

Related U.S. Application Data

(60) Provisional application No. 62/033,916, filed on Aug. 6, 2014.

(51) Int. Cl.
| | | |
|---|---|---|
| *G01V 3/00* | (2006.01) | |
| *G01V 3/02* | (2006.01) | |
| *G01V 3/08* | (2006.01) | |
| *G01V 3/28* | (2006.01) | |

(52) U.S. Cl.
CPC ..................... *G01V 3/28* (2013.01)

(58) Field of Classification Search
CPC ........................................... G01V 3/02
USPC ........................................ 324/336
See application file for complete search history.

(56) References Cited

U.S. PATENT DOCUMENTS

| | | |
|---|---|---|
| 4,628,266 A | 12/1986 | Dzwinel |
| 5,208,539 A | 5/1993 | Holmqvist et al. |
| 5,557,206 A | 9/1996 | Won |
| 5,610,523 A | 3/1997 | Elliot |
| 5,796,253 A | 8/1998 | Bosnar et al. |
| 6,791,329 B2 | 9/2004 | Nelson |
| 6,845,936 B1 | 1/2005 | Mouge et al. |
| 7,053,622 B2 | 5/2006 | Sørensen |
| 7,157,194 B2 | 1/2007 | Schroeder |
| 7,248,841 B2 | 7/2007 | Agee et al. |
| 7,646,201 B2 | 1/2010 | Miles et al. |
| 7,948,237 B2 | 5/2011 | Kuzmin et al. |
| 8,289,023 B2 | 10/2012 | Kuzmin et al. |
| 8,358,135 B2 | 1/2013 | Kuzmin et al. |

(Continued)

FOREIGN PATENT DOCUMENTS

| | | | |
|---|---|---|---|
| IN | 06420DN2006 | 8/2007 | |
| MX | 2008008390 | 12/2009 | ............... G01V 3/16 |

(Continued)

*Primary Examiner* — Bot Ledynh
(74) *Attorney, Agent, or Firm* — Patent Portfolio Builders PLLC

(57) ABSTRACT

A method and system for active cancellation of transient signals and dynamic loop configuration for geophysical exploration is disclosed. The method includes controlling a transmitter to transmit a waveform in a frequency spectrum during an on-time. The transmitter includes a plurality of turns of wire. The method also includes controlling a plurality of switches to direct an electrical signal through the plurality of turns of wire. The plurality of switches electrically coupled to the plurality of turns of wire. The method further includes controlling a switch of the plurality of switches to direct a first portion of a transient current in an opposite direction from a direction of a second portion of the transient current during an off-time.

14 Claims, 12 Drawing Sheets

(56) References Cited

U.S. PATENT DOCUMENTS

2010/0322293 A1   12/2010   Rhodes et al.
2012/0057716 A1   3/2012   Chang et al.

FOREIGN PATENT DOCUMENTS

| WO | 199633426 | 10/1996 | ............... G01V 3/10 |
| WO | 2012119254 | 9/2012 | ............. G01V 3/165 |

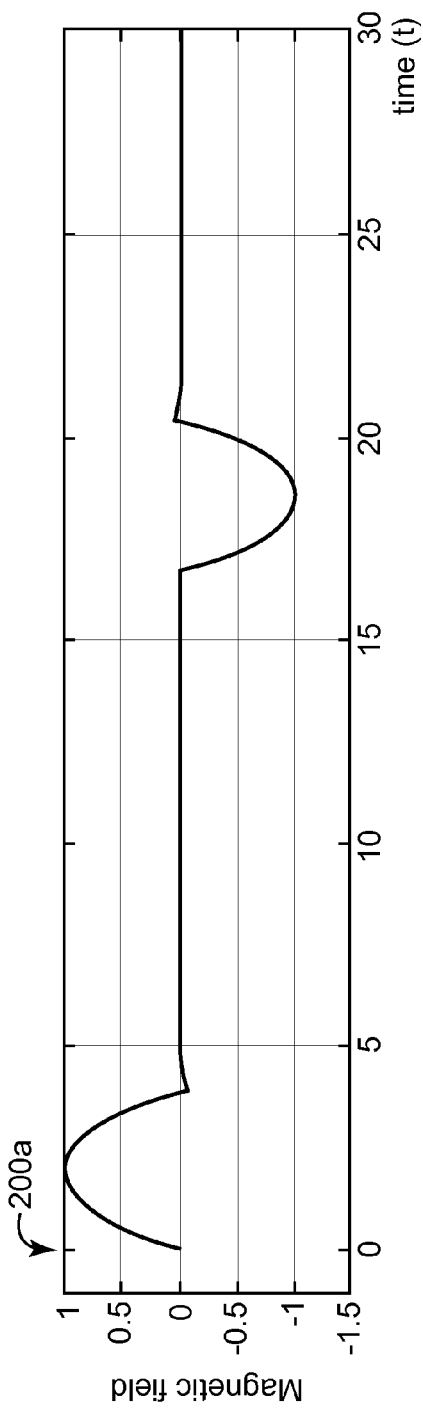
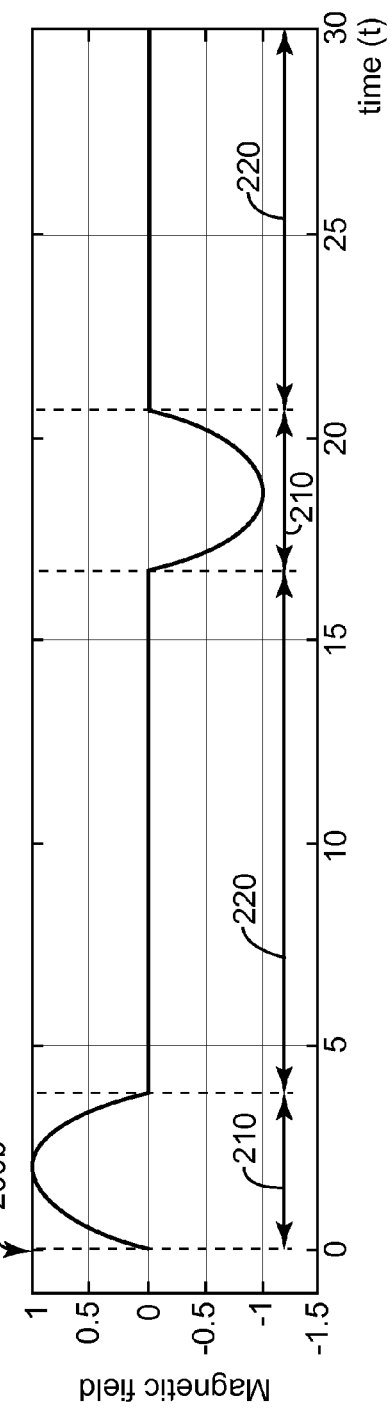
FIG. 2A
FIG. 2B

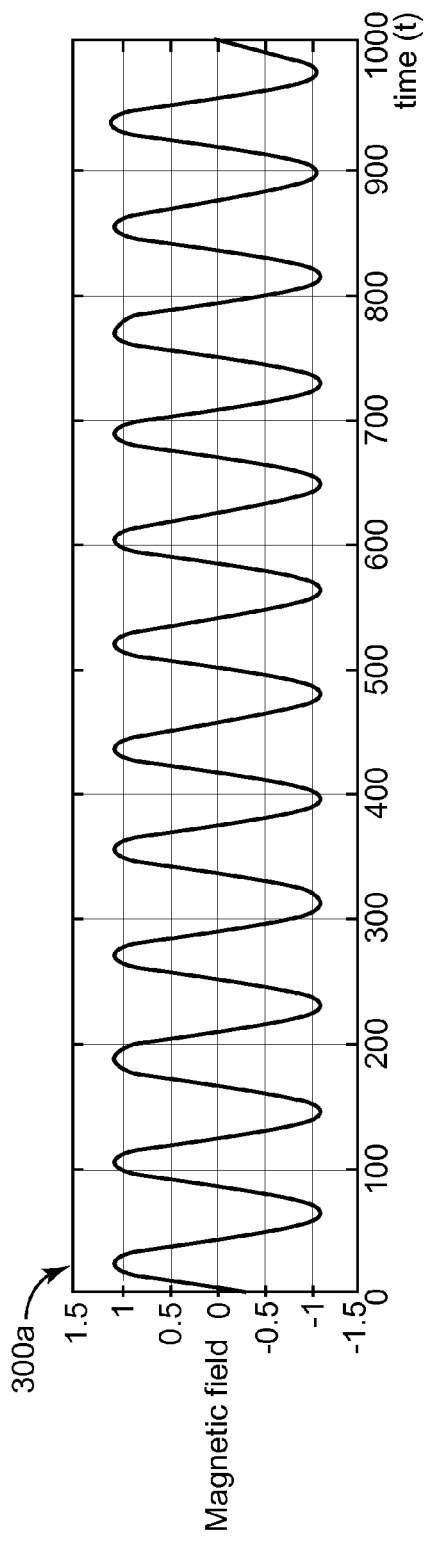
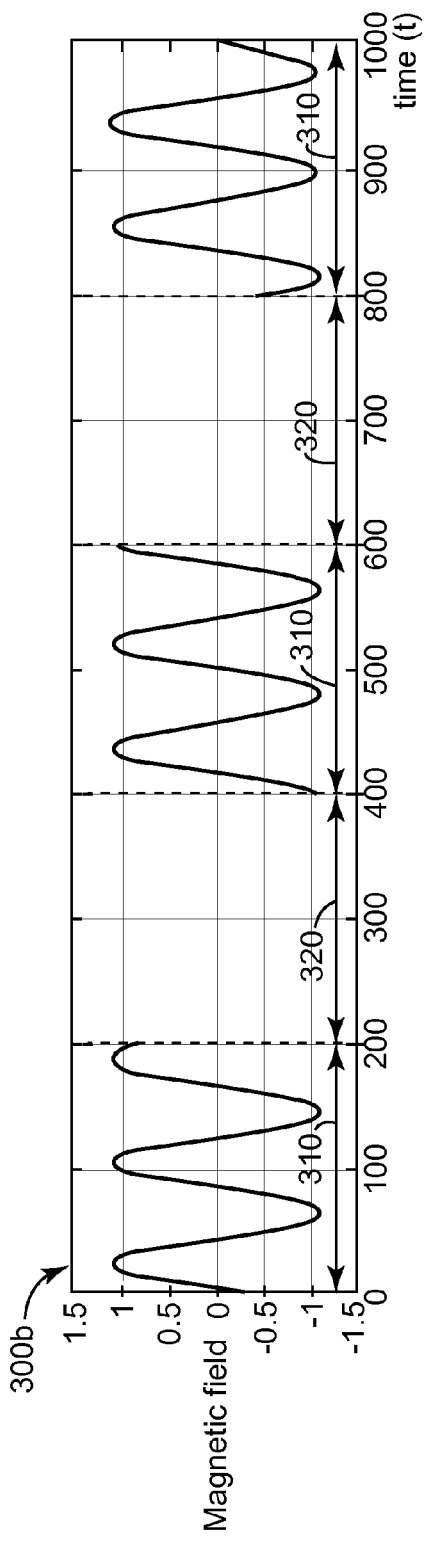

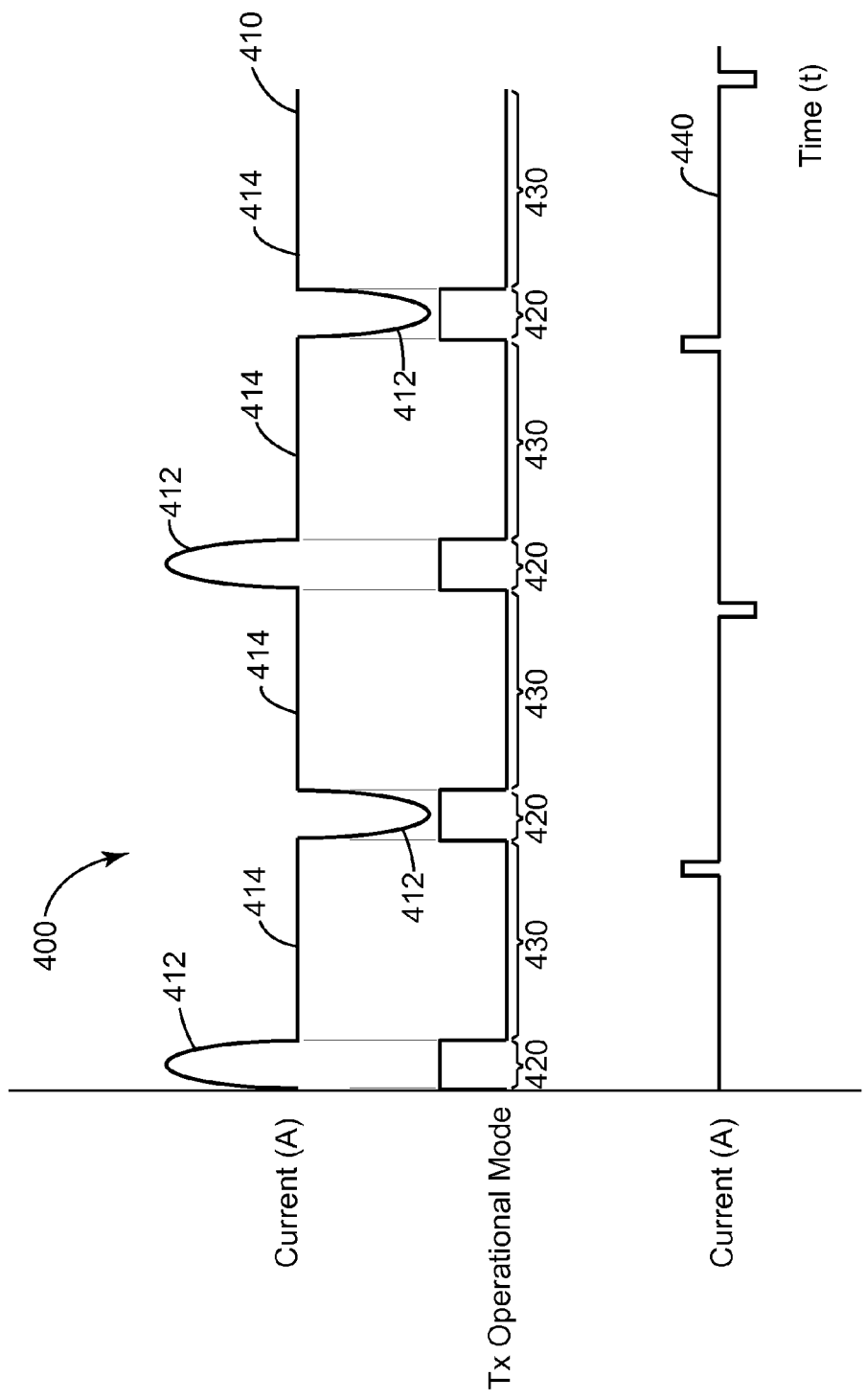

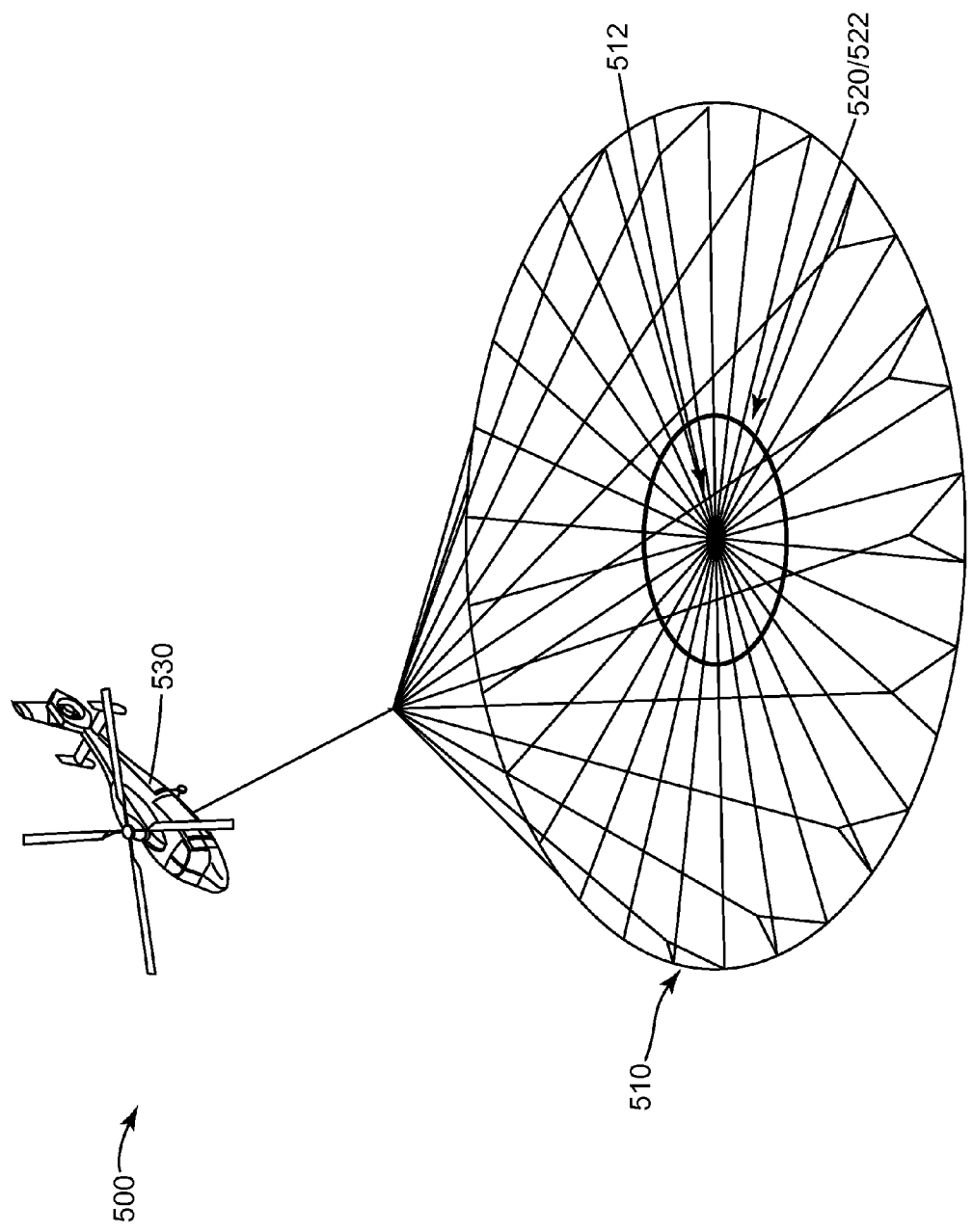

SYSTEMS AND METHODS FOR ACTIVE CANCELLATION OF TRANSIENT SIGNALS AND DYNAMIC LOOP CONFIGURATION

CROSS-REFERENCE TO RELATED APPLICATION

This application claims the benefit under 35 U.S.C. § 119(e) of U.S. Provisional Application Ser. No. 62/033,916 filed on Aug. 6, 2014, which is incorporated by reference in its entirety for all purposes.

TECHNICAL FIELD

The present disclosure relates generally to geophysical electromagnetic exploration and, more particularly, to systems and methods to actively (or dynamically) control the configuration of a coil including a method for active cancellation of transient signals or compensation in transmitters.

BACKGROUND

Electromagnetic (EM) geophysical exploration systems measure the response of subsurface formations to the propagation of naturally or artificially generated EM fields. Primary EM fields may be generated by passing alternating current or pulsing a current through a transmitter coil, which is an electrically conducting wire or tube that may have an air core or be wrapped around a core made of some electrical conductor. Use of an alternating current is referred to as frequency domain EM while the use of a pulsed current where the current is applied during an on-period and switched off during an off-period is referred to as time-domain EM or transient EM. In both cases, the time-variation of current passing through the transmitter coil produces a magnetic field in a large vicinity around the transmitter coil. A transmitter coil may be a small coil made up of many turns of wire or a large loop of wire with one or more turns. Subsurface formations respond to the propagation of time-varying primary EM fields with the generation of secondary electrical currents by the process of EM induction (which is the production of a voltage across a conductor when it is exposed to a time-varying magnetic field) giving rise to secondary EM fields. The primary and secondary EM fields may be detected by a "receiver." A receiver may measure the time-variation of the magnetic field from these currents (for example a coil receiver measuring dB/dt) or may measure the magnetic field itself (a B-field sensor). Hereinafter, the terms "transmitter coil," "transmitter loop," and "transmitter" may be used interchangeably and the terms "receiver coil," "receiver loop," and "receiver" may be used interchangeably.

The primary EM field propagates from the transmitter coil to the receiver via paths both above and below the surface of the earth. In the presence of a conducting body or earth material such as soils, rocks, ores or other conducting material, the magnetic component of the EM field penetrating the subsurface induces time-varying currents, or eddy currents, to flow in the conducting body. The eddy currents generate their own EM field (referred to as secondary EM field) that travels to the receiver. The receiver then undergoes a response to the resultant of the arriving primary and secondary EM fields so that the response differs in both phase and amplitude from the response to the primary EM field alone. Differences between the transmitted and received EM fields reveal the presence of the conducting body or conducting material and provide information on the conducting body's geometry and electrical properties.

Because EM fields propagate through air, there is no need for physical contact of either the transmitter coil or receiver coil with the earth's surface. EM geophysical exploration can thus proceed much more rapidly than galvanic method surveys, where ground contact is required. More importantly, one or both of transmitter coil and receiver coil can be mounted in or on or towed behind aircraft. Airborne EM methods are used in prospecting for conductive ore bodies and many other geological targets due to their speed and relative cost-effectiveness.

The EM response from subsurface materials or bodies is dependent on the electrical conductivity of the material or body. Ore bodies or other structures such as layers that have low electrical conductivity may still provide an EM response.

Thus, in summary, EM surveying or geophysical exploration uses the principle of EM induction to measure the electrical conductivity of the subsurface. In the case of a frequency-domain EM survey, an alternating electric current of known frequency and magnitude is passed through a transmitter coil creating a primary EM field in the space surrounding the coil, including underground. The time-varying EM fields induce a secondary current in underground conductors or structures which results in an alternating secondary magnetic field that is sensed by the receiving coil. The secondary field is distinguished from the primary field by a phase lag. The ratio of the magnitudes of the primary and secondary currents is proportional to the terrain conductivity. The depth of penetration of the EM field into the subsurface is governed by the subsurface electrical conductivity and transmitter excitation frequency and coil separation and orientation.

In the case of a transient EM survey, the same principle of EM induction is used to measure the electrical conductivity of the subsurface. A pulsed electric current of known amplitude and time-occurrence is passed through a transmitter coil creating a primary EM field in the space surrounding the coil, including underground. The eddy currents generated in the ground in turn induce a time-varying secondary magnetic field that is sensed by the receiving coil. In the off-time of the transmitter, the signal magnitude and time-variation of the signal magnitude is proportional to the terrain conductivity. In the on-time of the transmitter, the received signal is proportional to the terrain conductivity and to the transmitted primary signal. The depth of penetration of the EM field into the subsurface is governed by the terrain conductivity, transmitter power, transmitter excitation frequency and coil orientation.

In time-domain EM systems, the voltage in the receiver is proportional to the time rate of change of the current in the transmitter loop. The transmitter of these systems is designed to generate a magnetic impulse and then turn off the primary field so that the secondary fields from currents induced in the subsurface can be detected. Practically, it is very difficult to produce an ideal impulse because when an electric circuit is switched off, the electrical limitations of the system (for example, self-inductance) result in some residual current flow for a time. These remaining currents are detected by the receiver, thereby interfering with detection of the secondary fields from currents induced in the subsurface. Thus, a need has arisen for systems and methods that address these shortcomings of traditional EM geophysical exploration systems and methods.

SUMMARY

In accordance with some embodiments of the present disclosure, a method for geophysical exploration includes controlling a transmitter to transmit a waveform in a frequency spectrum during an on-time. The transmitter includes a plurality of turns of wire. The method also includes controlling a plurality of switches to direct an electrical signal through the plurality of turns of wire. The plurality of switches electrically coupled to the plurality of turns of wire. The method further includes controlling a switch of the plurality of switches to direct a first portion of a transient current in an opposite direction from a direction of a second portion of the transient current during an off-time.

In accordance with anther embodiment of the present disclosure, a method for geophysical exploration includes controlling a transmitter to transmit a waveform in a frequency spectrum during an on-time. The transmitter includes a plurality of turns of wire. The method also includes controlling a plurality of switches to direct an electrical signal through the plurality of turns of wire. The plurality of switches electrically coupled to the plurality of turns of wire. The method further includes configuring the plurality of switches to direct the electrical signal in one of a series loop configuration or a parallel loop configuration.

In accordance with anther embodiment of the present disclosure, an electromagnetic geophysical exploration system includes a transmitter with a plurality of turns of wire, a plurality of switches electrically coupled to the plurality of turns of wire, and a control system. The control system is configured control the transmitter to transmit a waveform in a frequency spectrum during an on-time, and control the plurality of switches to direct an electrical signal through the plurality of turns of wire. The control system is further configured to control a switch of the plurality of switches direct a first portion of a transient current in an opposite direction from a direction of a second portion of the transient current during an off-time.

In accordance with anther embodiment of the present disclosure, an electromagnetic geophysical exploration system includes a transmitter with a plurality of turns of wire, a plurality of switches electrically coupled to the plurality of turns of wire, and a control system. The control system is configured control the transmitter to transmit a waveform in a frequency spectrum during an on-time, and control the plurality of switches to direct an electrical signal through the plurality of turns of wire. The control system is further configured to configure the plurality of switches to direct the electrical signal in one of a series loop configuration or a parallel loop configuration.

BRIEF DESCRIPTION OF THE DRAWINGS

For a more complete understanding of the present disclosure and its features and advantages, reference is now made to the following description, taken in conjunction with the accompanying drawings, which may include drawings that are not to scale and wherein like reference numbers indicate like features, in which:

FIGS. 2A and 2B illustrate exemplary transmitter magnetic field versus time plots in accordance with some embodiments of the present disclosure;

FIGS. 3A and 3B illustrate synthetic transmitter magnetic field versus time waveforms in accordance with some embodiments of the present disclosure;

FIG. 4 illustrates an exemplary current versus time transmitter transient cancellation timing diagram in accordance with some embodiments of the present disclosure;

FIG. 5 illustrates an exemplary electromagnetic geophysical exploration system incorporating the transmitter in accordance with some embodiments of the present disclosure;

DETAILED DESCRIPTION

Figure 1:
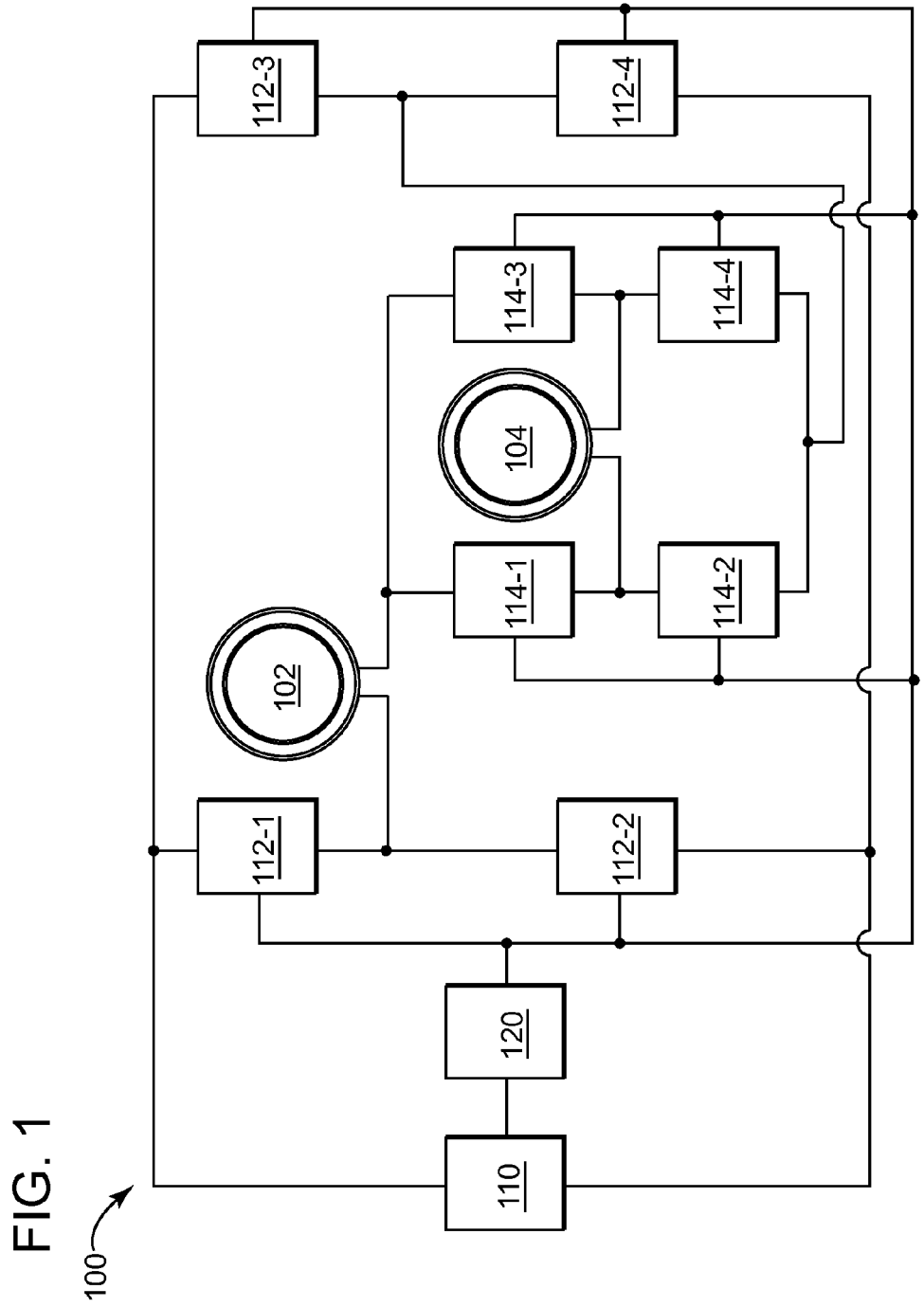
FIG. 1 illustrates a transmitter system in accordance with some embodiments of the present disclosure.

As described above, in an electromagnetic (EM) geophysical exploration system, a waveform is generated such that current flows through a transmitter coil to generate a magnetic impulse and is then turned off so that secondary fields from currents induced in the subsurface can be detected at a receiver. When the circuit is switched off, however, currents persist for a time in the transmitter coil, which is referred to as remnant or transient current and their magnetic field interferes with the desired measurements at the receiver. According to embodiments of the present disclosure, the field generated by the remnant or transient current in the transmitter coil is rapidly and effectively brought substantially to zero by counteracting the field using an opposing field.

A transmitter coil may include multiple turns of wire, which are employed to generate a primary EM field in the space surrounding the coil. At the turn-off of the pulse in the transmitter, the polarity of one or more of the turns of the transmitter may be reversed to yield net cancellation of the fields created by the transient currents. For example, when one out of the two turns of the transmitter is inverted, the decaying currents in the transmitter loop generate opposing magnetic fields. As such, the magnetic field in one of the two turns has direction opposite to the magnetic field in the other of the two turns, thereby resulting in the generated EM fields cancelling each other out.

The reversal of the polarity of one or more of the turns may occur during or at the end of the turn-off portion of the waveform in order to control or accelerate the ramp of the pulse, resulting in zero net magnetic field for the transmitter in the off-time. This result is desirable because in the off-time, the receiver is detecting any secondary fields present from currents induced in the subsurface by the magnetic impulse from the transmitter. These secondary fields detected by the receiver may have relatively low amplitude and EM fields caused by transient currents in the transmitter may interfere with their detection.

The following description of exemplary embodiments refers to the accompanying drawings. The same reference numbers in different drawings identify the same or similar elements. As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

FIG. 1 illustrates a transmitter system 100 in accordance with some embodiments of the present disclosure. Transmitter system 100 may include a transmitter loop that has a plurality of turns of wire. For example, as illustrated in FIG. 1, transmitter system 100 includes a first turn 102 and a second turn 104. First turn 102 and second turn 104 may be communicatively coupled separate turns of wire. Transmitter system 100 includes a transmitter driver circuit 110 electrically connected to the transmitter loop and configured to drive the transmitter, for example, by generating a predetermined waveform.

Transmitter system 100 also includes a plurality of first switching elements electrically coupled or connected to the plurality of turns of wire. As illustrated in FIG. 1, the plurality of first switching elements may include four outer switches: first outer switch 112-1, second outer switch 112-2, third outer switch 112-3, and fourth outer switch 112-4 (collectively "outer switches 112") electrically connected to first turn 102 and second turn 104. Outer switches 112 may be any suitable switch for the specific application. For example, outer switches 112 may be any combination of silicon-controlled rectifiers (SCR), insulated-gate bipolar transistors (IGBT), metal-oxide-semiconductor field-effect transistors (MOSFET), or other suitable elements. As illustrated in FIG. 1, outer switches 112 form an outer full or H-bridge circuit. Further, although transmitter system 100 is illustrated with four outer switches 112, any suitable number of outer switches 112 may be included in transmitter system 100.

Transmitter system 100 further includes a plurality of second switching elements electrically coupled or connected to the plurality of turns of wire. As illustrated in FIG. 1, the plurality of second switching elements may include four inner switches: first inner switch 114-1, second inner switch 114-2, third inner switch 114-3, and fourth inner switch 114-4 (collectively, "inner switches 114"). Each of inner switches 114 may be bi-directional alternating current (AC) switches, which may include a pair of switching elements. For example, each pair of switching elements may be a pair of MOSFETs. In some embodiments, other switching elements may be used in place of the pairs of MOSFETs, including, for example, IGBTs, SCRs, or other suitable elements. As illustrated in FIG. 1, inner switches 114 form an inner full or H-bridge circuit. Further, although transmitter system 100 is illustrated with four inner switches 114, any suitable number of inner switches 114 may be included in transmitter system 100.

Transmitter system 100 may further include a control circuit 120 electrically connected to each of the plurality of first switching elements and each of the plurality of second switching elements, and to transmitter driver circuit 110. Control circuit 120 may be configured to control transmitter driver circuit 110 to generate a predetermined waveform at a predetermined timing, sending current through first turn 102 and second turn 104. Control circuit 120 may also be configured to control the plurality of switching elements to regulate the current flowing to each of first turn 102 and second turn 104.

In a two turn transmitter loop, for example, after current is fired through the transmitter loop, there is an off-time period for detecting signals from the earth's surface and subsurface at a receiver. Under such circumstances, decaying currents in the transmitter cause a response to be detected by the receiver in the off-time period. According to embodiments described herein, however, by inverting one of the two turns, the EM fields caused by the transient currents substantially cancel each other, such that the magnitude of the EM fields caused by the transient current at the receiver is minimized. Because the transient currents in the two turns of the transmitter loop are creating opposing EM fields, they may substantially cancel each other out.

Thus, in operation, after current is turned off, the inner full bridge circuit depicted in FIG. 1 is configured to reverse or invert the polarity of one of the two turns (for example second turn 104). Accordingly, the transient current in second turn 104 is inverted with respect to the transient current in first turn 102, such that the transient current in second turn 104 substantially cancels the transient current in first turn 102. After the transient currents have fully decayed or once the turn-off-time has ended, control circuit 120 may control the plurality of switches to return second turn 104 to its normal polarity for the next cycle or waveform. The polarity of the loop is reversed at a predetermined timing. The predetermined timing may be controlled around the turn-off-time so as to not affect the emitted pulse and to only substantially eliminate the current remaining after the desired turn-off.

In operation, for example, a waveform may have an on-time of approximately four milliseconds (ms) and an off-time of approximately sixteen ms, such that the second turn may be in its normal state for approximately four ms and then inverted for approximately sixteen ms. This cycle may be repeated at a particular frequency, for example selected from a range of less than ten hertz (Hz) to several hundred Hz.

Although the circuit diagram of FIG. 1 illustrates a transmitter loop of two turns in which one is inverted, embodiments of the present disclosure can be applied to transmitter loops with any number of turns (for example by inverting the polarity of half of the turns). Further, transmitter system 100 may be used in dual (or multiple) transmitter systems such that when a second transmitter is firing subsequent to the turn-off of the first transmitter, the transient current in the first transmitter may be substantially cancelled so as not to interfere with detecting secondary fields from the earth's surface and subsurface at the receiver in response to the signal from the second transmitter. Transmitter system 100 is pertinent for any time-domain geophysical system, including but not limited to ground, airborne, and water or marine.

FIGS. 2A and 2B illustrate exemplary transmitter magnetic field versus time plots in accordance with some embodiments of the present disclosure. Test plot 200a illustrates an exemplary magnetic field waveform before applying the transient cancellation circuit. In test plot 200b, the exemplary magnetic field is illustrated using the transient cancellation circuit. Bands 210 correspond to the measured field when the turns of the transmitter loop are operating in normal (non-cancelling) mode. Spaces 220 between bands 210 correspond to the measured field when half the turns of the transmitter loop are inverted, such that the field generated by current passing through the inverted turns substantially cancels the field generated by current passing through the non-inverted turns of the transmitter loop, resulting in a substantially nulled field.

FIGS. 3A and 3B illustrate synthetic transmitter magnetic field versus time waveforms in accordance with some of the embodiments of the present disclosure. Test plot 300a illustrates an exemplary synthetic magnetic field waveform before applying the transient cancellation circuit. In test plot 300b, the exemplary synthetic magnetic field is illustrated using the transient cancellation circuit. Bands 310 correspond to the measured field when the turns of the transmitter loop are operating in normal (or non-cancelling) mode. Spaces 320 between bands 310 correspond to the measured field when half the turns of the transmitter loop are inverted, such that the field generated by current passing through the inverted turns substantially cancels the field generated by the current passing through the non-inverted turns of the transmitter loop, resulting in a substantially nulled field.

FIG. 4 illustrates an exemplary current versus time transmitter transient cancellation timing diagram 400 in accordance with some embodiments of the present disclosure. Main transmitter current waveform 410 represents an example of a signal generated by the transmitter. Half-sine wave portions 412 of waveform 410 correspond to normal mode 420 of the transmitter loop operation. Flat portions 414 of waveform 410 correspond to cancellation mode 430 of the transmitter loop operation in which half of the turns in transmitter loop are inverted. During cancellation mode 430, a secondary transmitter or transmitter/receiver pair may be activated. Because the main transmitter is in cancellation mode 430, signals from a secondary transmitter or transmitter/receiver pair are less affected by magnetic coupling to the main, and often larger, transmitter loop. As such, cancellation mode 430 enables the operation of a system with multiple transmitters and/or receivers resulting in a multiple bandwidth system. The secondary transmitter or transmitter/receiver pair may generate a waveform, such as secondary transmitter current waveform 440. Timing diagram 400 or another suitable timing diagram may be utilized to control the timing of switching the polarity of selected turns of the transmitter loop.

FIG. 5 illustrates an exemplary EM geophysical exploration system 500 incorporating a transmitter in accordance with some embodiments of the present disclosure. EM geophysical exploration system 500, also referred to as "system 500," may be in communication with a transmitter system, such as transmitter system 100 discussed with reference to FIG. 1, and utilized to conduct a survey over a portion of the earth's surface. For example, system 500 may include a helicopter 530 for conducting geophysical exploration. Alternatively, an airplane, airship, or other airborne vehicle may be used, and in alternative arrangements, any land or marine vehicle may be used. In system 500, helicopter 530 tows one or more transmitters and receivers. A multiple bandwidth EM system is depicted in FIG. 5 with a low-frequency transmitter 510 disposed around a secondary transmitter-receiver unit 520/522. Low-frequency transmitter 510 may be a substantially circular coil, forming a loop around transmitter-receiver unit 520. Low-frequency transmitter 510 is secured via a plurality of different points and suspended from helicopter 530. Low-frequency receiver 512 is disposed substantially at the center of the loop formed by low frequency transmitter 510. Another embodiment may be to place the low-frequency receiver at the apex of the set of cables supporting the low-frequency transmitter 510 or set of cables supporting other high-frequency loops. Low-frequency transmitter 510 and low-frequency receiver 512 are configured to be optimized to operate in a low-frequency bandwidth.

In some embodiments, high-frequency transmitter 520 and high-frequency receiver 522 are minimum-coupled or null-coupled. For example, high-frequency receiver 522 may be arranged with respect to high-frequency transmitter 520 to be in a "null" location. Further, high-frequency transmitter 520 and high-frequency receiver 522 may form a substantially circular coil and may be disposed to form a loop surrounding low-frequency receiver 512, but with a smaller diameter than low-frequency transmitter 510.

For example, the null-coupled high frequency transmitter-receiver pair may be arranged such that the high-frequency receiver 522 is null or minimum coupled to high-frequency transmitter 520. High-frequency receiver 522 and high-frequency transmitter 520 may each be substantially circular coils or loops. In some embodiments, any of low-frequency transmitter 510, low-frequency receiver 512, high-frequency transmitter 520, and high-frequency receiver 522 may be square, diamond, rectangle, or other polygonal shape.

In some embodiments, measurements may be made utilizing two or more distinct transmitter-receiver pairs. Each of the pairs may be optimized to a particular frequency band of interest, thereby providing an improved data set at all frequencies. A particular survey may include many cycles of transmitting and receiving EM signals and is not limited to any order of processes described herein.

Figure 6:
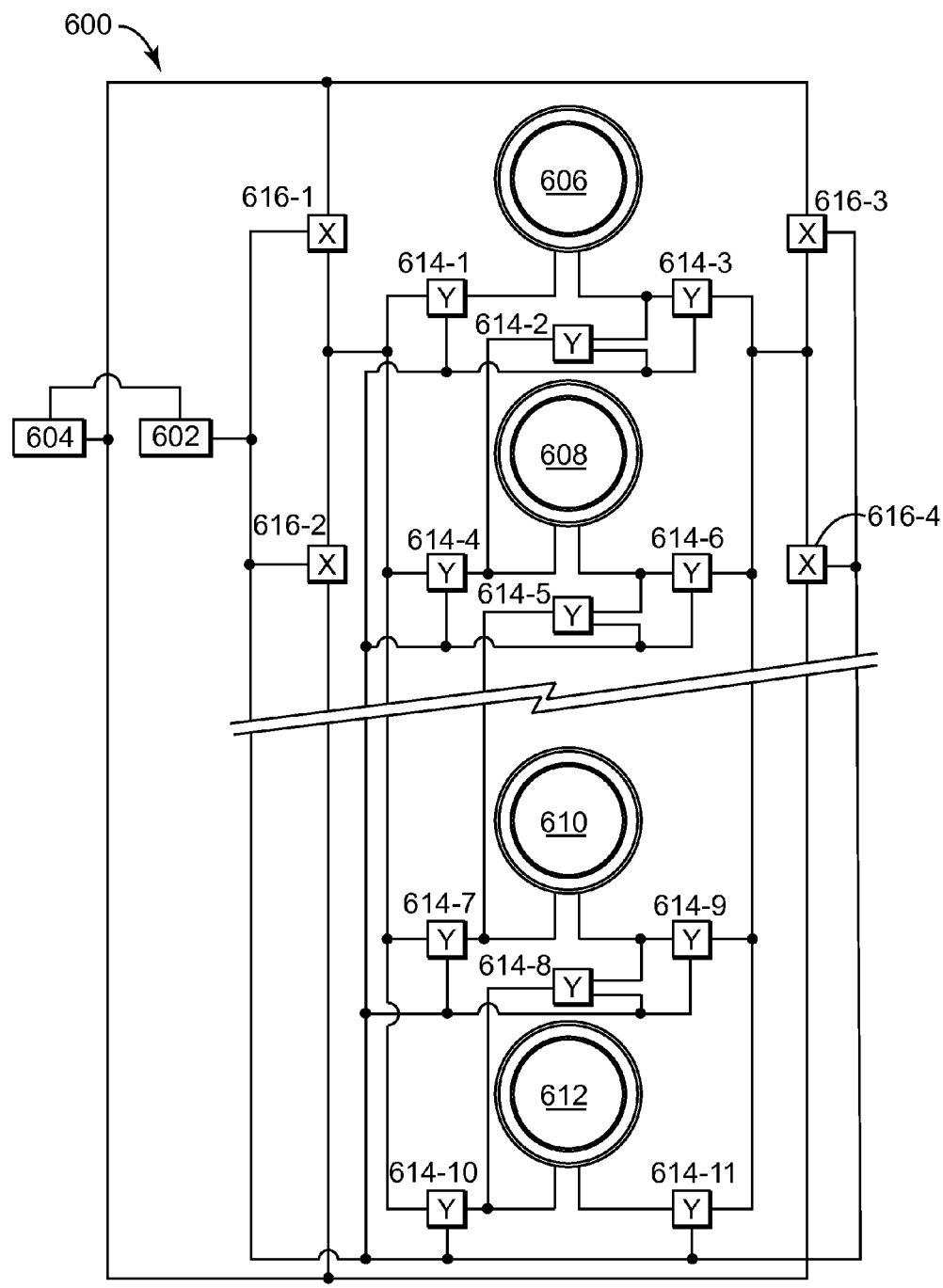
FIG. 6 illustrates a transmitter system in accordance with some embodiments of the present disclosure.

According to some embodiments, dynamic control of the loop configuration, such as reconfiguring individual turns of the loop to be connected electronically in series or in parallel, allows for control over the total inductance, capacitance, and/or resistance of the loop. FIG. 6 illustrates transmitter system 600 in accordance with some embodiments of the present disclosure. Transmitter system 600 allows for configuring the transmitter turns to accommodate the desired waveform shape, loop characteristics, and the amount of power transmitted to the earth's surface. The amount of power is related to a product of the number of turns, the area, and the current in transmitter system 600. For example, a greater number of turns in transmitter system 600 results in a greater amount of power. Thus, based on the amount of power required for a particular survey, a number of turns in transmitter system 600 may be specified. In other words, by having control over the transmitter loop via dynamic control of the loop configuration, the loop may be configured for a series configuration to provide, for example, a large moment with higher power and more turns, or a parallel configuration to provide, for example, a fast moment with less power and fewer turns, or a cancelling configuration with half of the turns inverted, or magnetically cancelling.

Transmitter system 600 may include control circuit 602 and transmitter driver circuit 604 to generate and control generation of waveform signals for the transmitter. Transmitter driver circuit 604 may be configured to control driving of the waveform for the transmitter. Transmitter system 600 may include any number of turns, for example, first turn 606, second turn 608, n–1 turn 610, and n turn 612, as shown in FIG. 6. Each of the turns may be electrically connected to switching devices, such that a number of switching devices are arranged between respective turns. For example, inner switches 614-1, 614-2, and 614-3 may be electrically connected between first turn 606 and second turn 608. Similarly, inner switches 614-4, 614-5, and 614-6 may be electrically connected between second turn 608 and n–1 turn 610; and inner switches 614-7, 614-8, and 614-9 may be electrically connected between n–1 turn 610 and n turn 612.

Additional inner switches 614-10 and 614-11 may provide additional electrical connections to control circuit 602 or other components of transmitter system 600. Inner switches 614-1 through 614-11 may be referred to collectively as "inner switches 614."

Transmitter system 600 may further include outer switches 616-1, 616-2, 616-3, and 616-4, collectively "outer switches 616." Outer switches 616 may be configured to form an outer full bridge circuit, as discussed with reference to FIG. 1 and outer switches 112. Outer switches 616 in transmitter system 600 are labelled X for standard or typical devices which may include MOSFET devices, IGBT devices, SCR devices, or other suitable elements; whereas inner switches 614 are labelled Y to designate bidirectional AC switches, or switches that are designed to block current in both directions or polarities. For example, among other ways, two devices may be placed in a configuration in which they are back-to-back. This configuration allows for blocking in both directions regardless of the polarity of the external circuit.

The arrangement of switches in transmitter system 600 allows changes to be made to increase or decrease power by increasing or decreasing the number of turns while also changing the pulse waveform on a cycle-by-cycle basis. Further, the use of system 600 may eliminate the need to separately design and build a transmitter system for each particular application or job. Thus, a single transmitter system 600 may be used for different applications or jobs, and while the transmitter is in use, reconfiguration of the turns may occur for each pulse, if necessary, with the switches of transmitter system 600. Control circuit 602 may be configured to control whether each of the switches are open or closed, which controls the effective configuration of turns within the transmitter system 600. As applied to time domain EM surveying, the control system and timing of the switching allows for reconfiguring transmitter system 600 on a cycle-by-cycle basis to achieve a desired surveying result.

Figure 7:
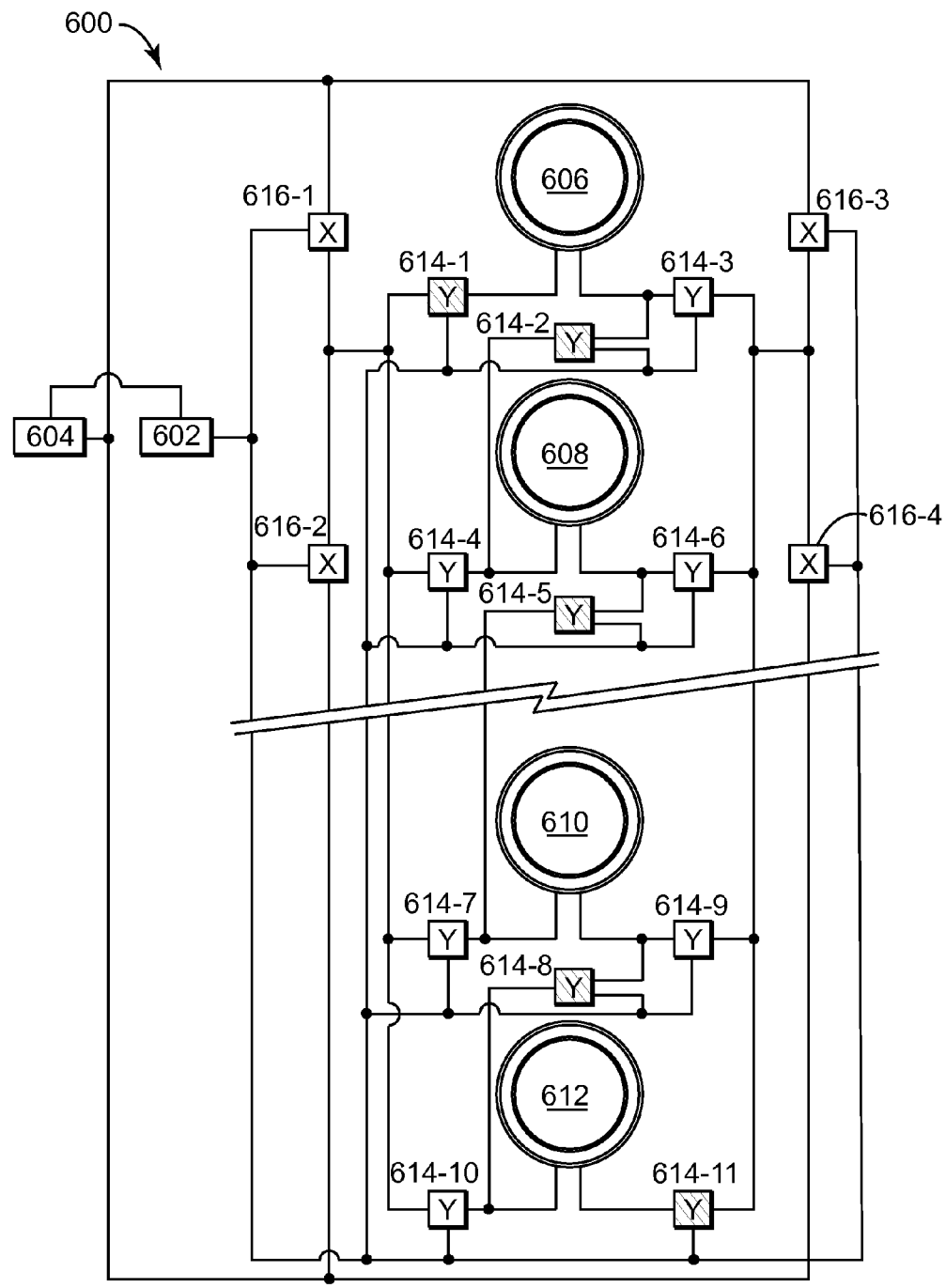
FIG. 7 illustrates a transmitter system with a series loop configuration in accordance with some embodiments of the present disclosure.

FIG. 7 illustrates transmitter system 700 in a series loop configuration in accordance with some embodiments of the present disclosure. In the series loop configuration, for example, switches 614-1 and 614-2 are closed while switch 614-3 is open. In FIG. 7, closed switches are shaded while open switches are not shaded. Thus, for example, switches 614-5 and 614-8 are closed, while switches 614-4, 614-6, 614-7, and 614-9 are open. Further, switch 614-11 is closed while switch 614-10 is open. The configuration of switches being opened and closed creates a series loop arrangement of transmitter system 700 with the turns electrically connected in series.

Figure 8:
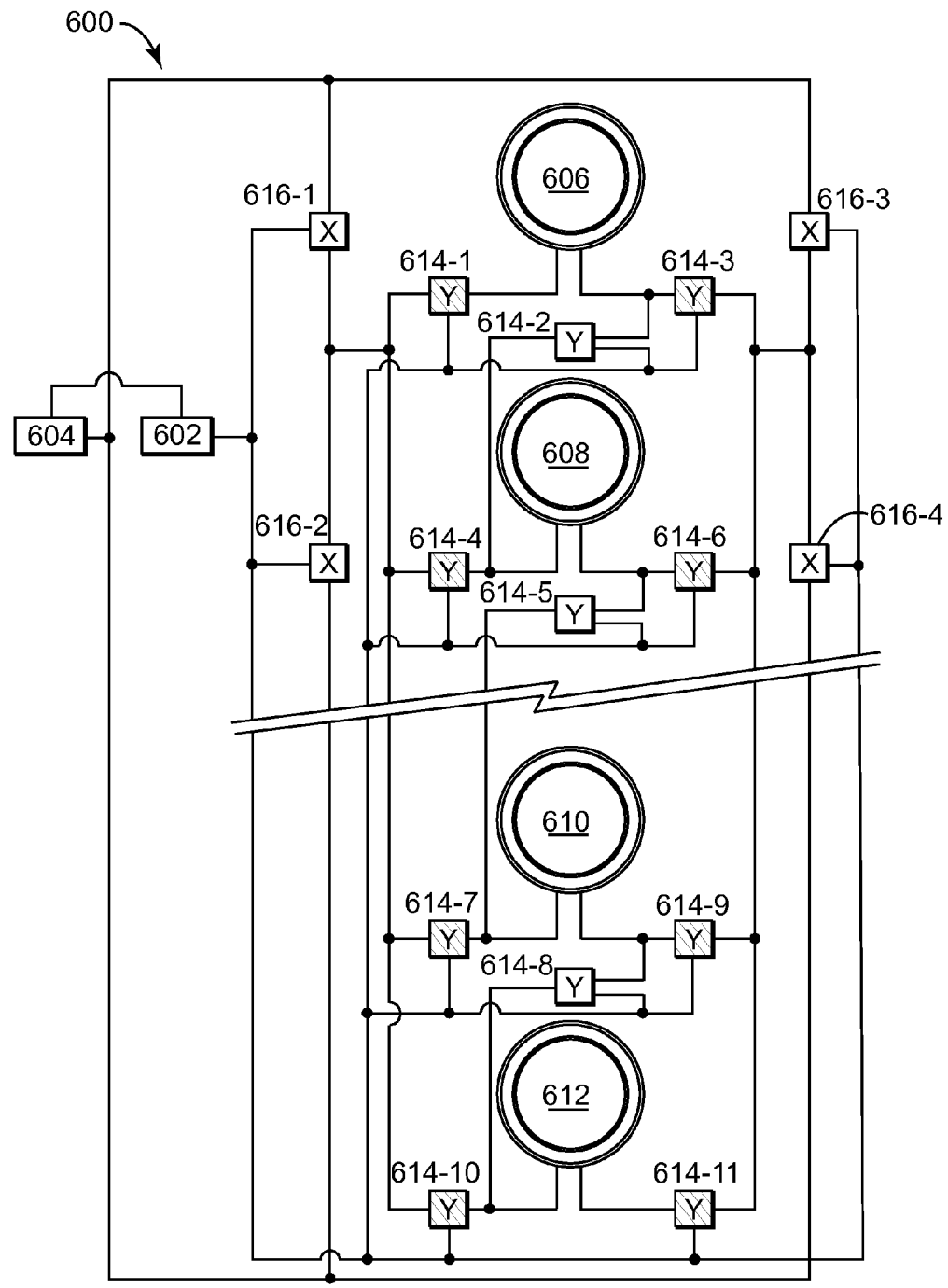
FIG. 8 illustrates a transmitter system with a parallel loop configuration in accordance with some embodiments of the present disclosure.

FIG. 8 illustrates transmitter system 800 with a parallel loop configuration in accordance with some embodiments of the present disclosure. In the parallel loop configuration, for example, switches 614-1 and 614-3 are closed while switch 614-2 is open. In FIG. 8, closed switches are shaded while open switches are not shaded. Thus, for example, switches 614-4, 614-6, 614-7, and 614-9 are closed, while switches 614-5 and 614-8 are open. Further, switches 614-10 and 614-11 are closed. The configuration of switches being opened and closed creates a parallel loop arrangement of transmitter system 800 with the turns electrically connected in parallel.

Figure 9:
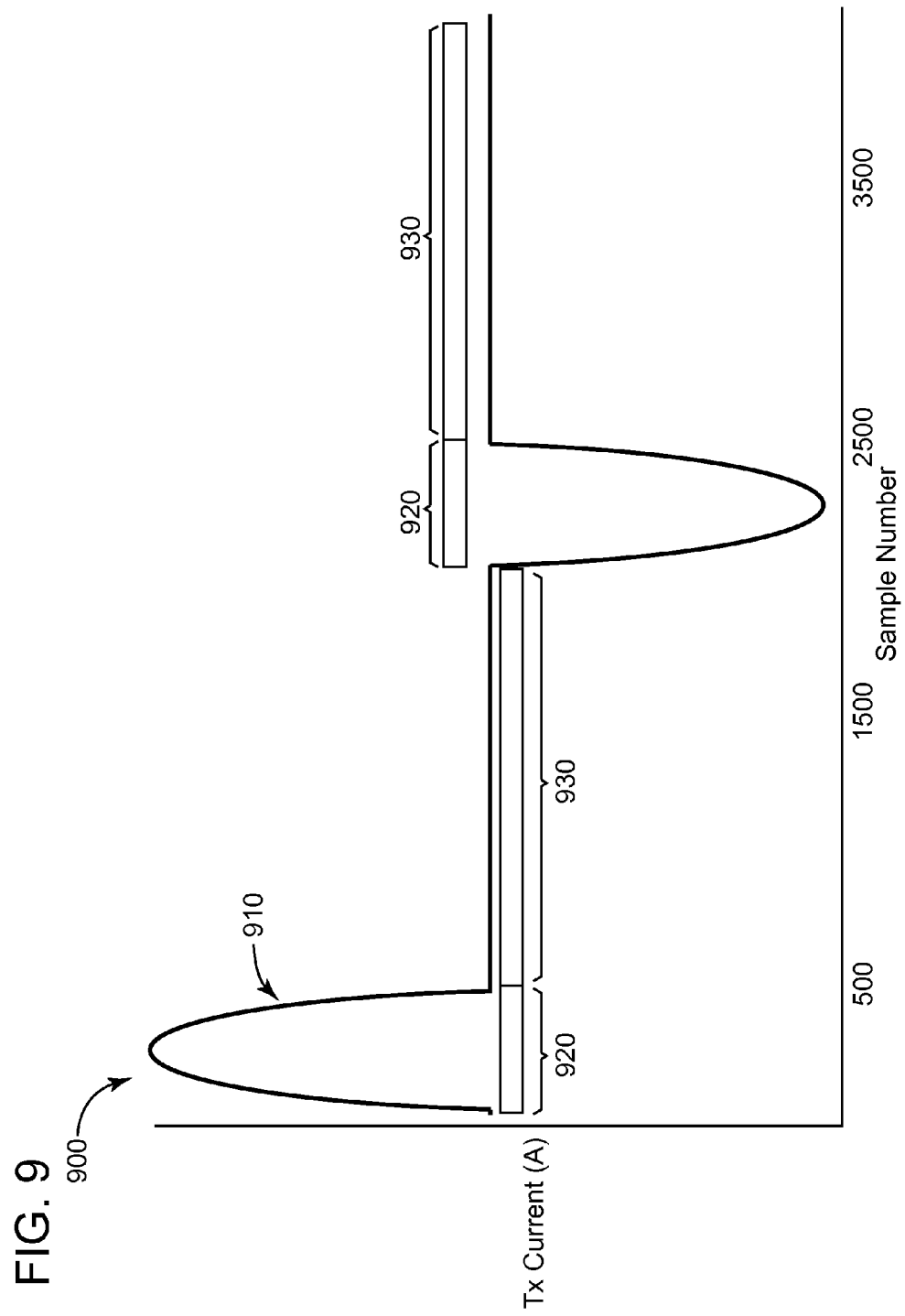
FIG. 9 illustrates an exemplary current versus sample number transmitter transient cancellation timing diagram in accordance with some embodiments of the present disclosure.

FIG. 9 illustrates an exemplary current versus sample number timing diagram 900 for transmitter transient cancellation in accordance with some embodiments of the present disclosure. Timing diagram 900 enables reconfiguring a transmitter system—such as transmitter system 600, 700, or 800 of FIGS. 6, 7, and 8, respectively—on a cycle-by-cycle basis. In timing diagram 900, normal mode 920 corresponds to time that all turns in a transmitter system have the same polarity. Cancellation mode 930 corresponds to the time that half of the turns in a transmitter system have inverted polarity with respect to the other half of the turns in the transmitter system. Waveform 910 is the current waveform of a half sine transmitter. Thus, for example, the switching devices are controlled to be configured for the turns to operate in normal polarity for a predetermined period of time 920 and then the switching devices are controlled to be configured for half of the turns to operate in reverse polarity for a predetermined period of time 930, thereby substantially cancelling magnetic field caused by the transient current.

Figure 10:
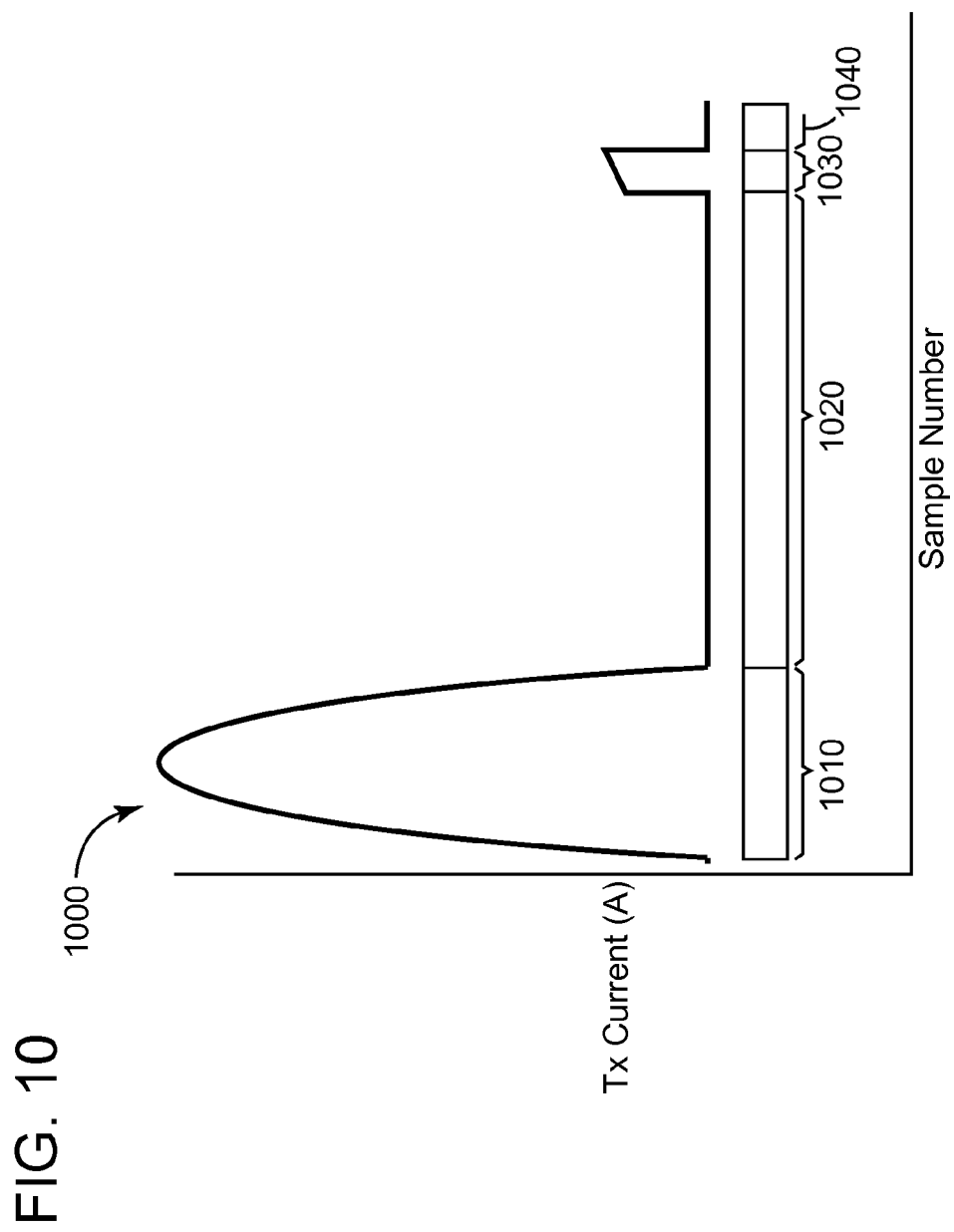
FIG. 10 illustrates an exemplary current versus sample number timing diagram in accordance with some embodiments of the present disclosure.

FIG. 10 illustrates an exemplary current versus sample number timing diagram 1000 depicting dynamic control of transmitter systems in accordance with some embodiments of the present disclosure. For example, the switches may be controlled to configure the transmitter in a series loop configuration (such as shown in FIG. 7) that includes multiple series turns at normal mode 1010. Then, during cancellation mode 1020, half of the turns in the transmitter have inverted polarity with respect to the other half of the turns in the transmitter, to achieve cancellation of the magnetic field caused by transient current. At normal mode 1030, the switches may be controlled to configure the transmitter in a parallel loop configuration (such as shown in FIG. 8) that includes multiple parallel turns. This may be followed by another cancellation period 1040 in which half of the turns in the transmitter have inverted polarity with respect to the other half of the turns in the transmitter.

Figure 11:
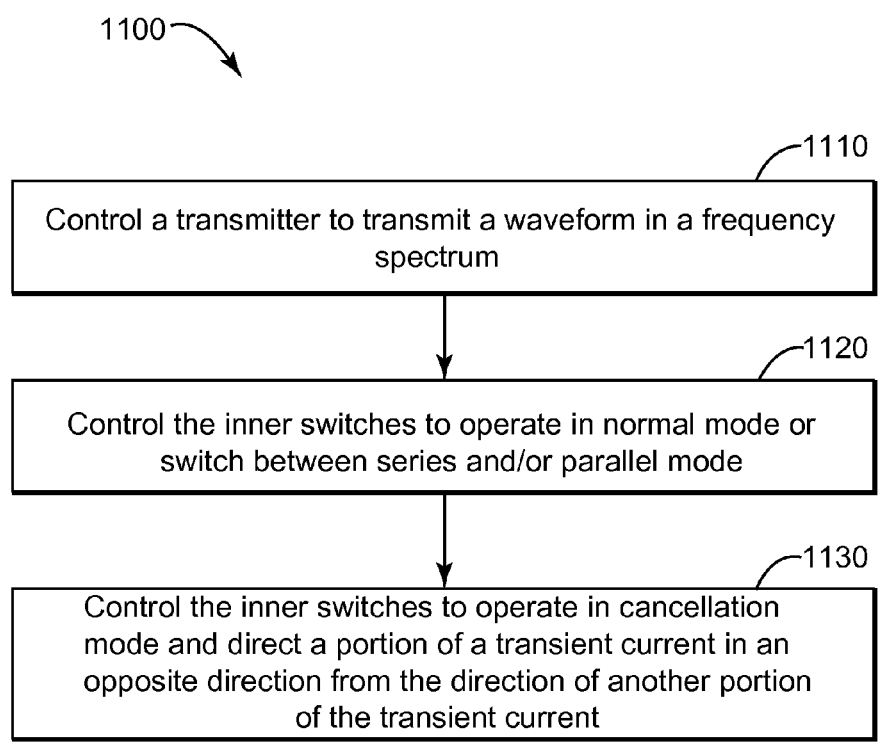
FIG. 11 illustrates a flow chart of an example method for active cancellation of transient signals and dynamic loop configuration for electromagnetic geophysical exploration in accordance with some embodiments of the present disclosure.

FIG. 11 illustrates a flow chart of an example method 1100 for active cancellation of transient signals and dynamic loop configuration for EM geophysical exploration in accordance with some embodiments of the present disclosure. For illustrative purposes, method 1100 is described with respect to control system 1206, discussed with reference to FIG. 12, which may include control circuit 602 and driver circuit 604 to manage transmitter systems 600, 700, or 800, discussed with reference to FIGS. 6, 7, and 8, respectively; however, method 1100 may be used to manage any appropriate transmitter system of any EM geophysical exploration system. The steps of method 1100 can be performed by a user, electronic or optical circuits, various computer programs, models, or any combination thereof, configured to process geophysical data. The programs and models may include instructions stored on a non-transitory computer-readable medium and operable to perform, when executed, one or more of the steps described below. The computer-readable media can include any system, apparatus, or device configured to store and retrieve programs or instructions such as a hard disk drive, a compact disc, flash memory, or any other suitable device. The programs and models may be configured to direct a processor or other suitable unit to retrieve and execute the instructions from the computer readable media. Collectively, the user, circuits, or computer programs and models used to process geophysical data may be referred to as a "control system." For example, the control system may include control circuit 602 and driver circuit 604 discussed with reference to FIGS. 6, 7, and 8. In some embodiments, portions of the control system are located on transmitters, on helicopter 530 shown in FIG. 5, or located elsewhere, and receive data stored during the geophysical exploration. For example, the control system may record data and deliver the recorded data to a computing system for processing at a later time. A particular survey may include many cycles of transmitting and receiving electromagnetic signals and is not limited to any order of processes described herein.

Method 1100 begins at step 1110 where the control system controls a transmitter to transmit a waveform in a frequency spectrum. For example, the control system, via driver circuit 604, may control low-frequency transmitter 510, discussed with reference to FIG. 5, to transmit a low frequency signal.

At step 1120, the control system controls the inner switches to operate in normal mode or switch between series or parallel mode. For example, the control system, via control circuit 602, may control inner switches 614 to operate in a serial configuration, as discussed with reference to FIG. 7, or a parallel configuration, as discussed with reference to FIG. 8.

At step 1130, after a predefined on-time, the control system controls the inner switches to operate in cancellation mode to direct a portion of a transient current in an opposite direction from the direction of another portion of the transient current. As example, the inner switches may reverse the polarity of at least a portion of the transient current in at least one of the turns of wire in the transmitter loop. As such, the control system, via control circuit 602, may control inner switches 614 to reverse the polarity of second turn 608 discussed with reference to FIG. 6, after an on-time of approximately four ms. In some embodiments, the control system may control inner switches 614 to reverse the polarity of approximately half the turns of wire in the transmitter loop. After a predefined off-time, method 1100 may return to step 1120. For example, after an off-time period related to the operating frequency, method 1100 may return to step 1120.

According to embodiments of the disclosure, the transmitter system allows for improved detection of secondary EM fields. In contrast to known systems that use compensation techniques to account for transient currents in the transmitter, which are imperfect based on assumptions about consistency in behavior of transmitter loop conductors, the transmitter system described herein substantially cancels the magnetic fields caused by the transient currents.

Current flowing in the transmitter loop after turn-off is a limiting factor for known time-domain systems. In the described embodiments, the remnant current flow and unwanted primary field noise is substantially eliminated. Elimination of the remnant field provides the ability to sample earlier for weak secondary decays.

Figure 12:
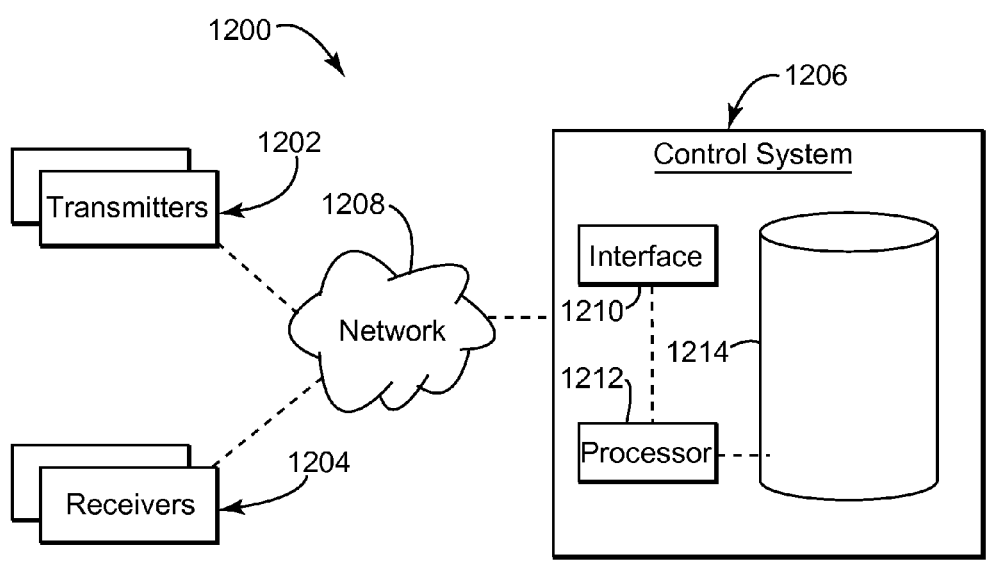
FIG. 12 illustrates a schematic diagram of an example system that can be used for active cancellation of transient signals and dynamic loop configuration for EM geophysical exploration in accordance with some embodiments of the present disclosure.

FIG. 12 illustrates a schematic diagram of an example system 1200 that can be used for active cancellation of transient signals and dynamic loop configuration for EM geophysical exploration in accordance with some embodiments of the present disclosure. System 1200 includes one or more transmitters 1202, one or more receivers 1204, and control system 1206, which are communicatively coupled via network 1208. Control system 1206 may include some or all components of control circuit 602 discussed with reference to FIGS. 6, 7, and 8.

Control system 1206 can operate in conjunction with transmitters 1202 and receivers 1204 having any structure, configuration, or function. Transmitters 1202 may include low-frequency transmitters and high-frequency transmitters, and receivers 1204 may include low-frequency receivers and high-frequency receivers. Further, a positioning system, such as a global positioning system (GPS, GLONASS, etc.), may be utilized to locate or time-correlate transmitters 1202 and receivers 1204.

Control system 1206 may include any instrumentality or aggregation of instrumentalities operable to compute, classify, process, transmit, receive, store, display, record, or utilize any form of information, intelligence, or data. For example, control system 1206 may be one or more mainframe servers, desktop computers, laptops, cloud computing systems, storage devices, or any other suitable devices and may vary in size, shape, performance, functionality, and price. Control system 1206 may include random access memory (RAM), one or more processing resources such as a central processing unit (CPU) or hardware or software control logic, or other types of volatile or non-volatile memory. Additional components of control system 1206 may include one or more disk drives, one or more network ports for communicating with external devices, various input and output (I/O) devices, such as a keyboard, a mouse, and a video display. Control system 1206 may be configured to permit communication over any type of network 1208. Network 1208 can be a wireless network, a local area network (LAN), a wide area network (WAN) such as the Internet, or any other suitable type of network.

Network interface 1210 represents any suitable device operable to receive information from network 1208, transmit information through network 1208, perform suitable processing of information, communicate with other devices, or any combination thereof. Network interface 1210 may be any port or connection, real or virtual, including any suitable hardware and/or software (including protocol conversion and data processing capabilities) that communicates through a LAN, WAN, or other communication system. This communication allows control system 1206 to exchange information with network 1208, other control systems 1206, transmitters 1202, receivers 1204, or other components of system 1200. Control system 1206 may have any suitable number, type, and/or configuration of network interface 1210.

Processor 1212 communicatively couples to network interface 1210 and memory 1214 and controls the operation and administration of control system 1206 by processing information received from network interface 1210 and memory 1214. Processor 1212 includes any hardware and/or software that operates to control and process information. In some embodiments, processor 1212 may be a programmable logic device, a microcontroller, a microprocessor, any suitable processing device, or any suitable combination of the preceding. Control system 1206 may have any suitable number, type, and/or configuration of processor 1212. Processor 1212 may execute one or more sets of instructions to implement multiple bandwidth electromagnetic surveying, including the steps described above with respect to FIG. 11. Processor 1212 may also execute any other suitable programs to facilitate the generation of broadband composite images such as, for example, user interface software to present one or more GUIs to a user.

Memory 1214 stores, either permanently or temporarily, data, operational software, or other information for processor 1212, other components of control system 1206, or other components of system 1200. Memory 1214 includes any one or a combination of volatile or nonvolatile local or remote devices suitable for storing information. For example, memory 1214 may include random access memory (RAM), read only memory (ROM), flash memory, magnetic storage devices, optical storage devices, network storage devices, cloud storage devices, solid-state devices, external storage devices, any other suitable information storage device, or a combination of these devices. Memory 1214 may store information in one or more databases, file systems, tree structures, any other suitable storage system, or any combination thereof. Furthermore, different types of information stored in memory 1214 may use any of these storage systems. Moreover, any information stored in memory may be encrypted or unencrypted, compressed or uncompressed, and static or editable. Control system 1206 may have any suitable number, type, and/or configuration of memory 1214. Memory 1214 may include any suitable information for use in the operation of control system 1206. For example, memory 1214 may store computer-executable instructions operable to perform the steps discussed above with respect to FIG. 11 when executed by processor 1212. Memory 1214 may also store any seismic data or related data such as, for example, raw seismic data, reconstructed signals, velocity models, seismic images, or any other suitable information.

The foregoing detailed description does not limit the disclosure. Instead, the scope of the disclosure is defined by the appended claims. The described embodiments are not limited to the disclosed configurations, and may be extended to other arrangements.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. For example, a receiver does not have to be turned on but must be configured to receive reflected energy.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. For example, the transmitting waveform, receiving sensed signals, and processing of received signals processes may be performed through execution of computer program code in a computer-readable medium.

Embodiments of the present disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer-readable storage medium or any type of media suitable for storing electronic instructions, and coupled to a computer system bus. Furthermore, any computing systems referred to in the specification may include a single processor or may be architectures employing multiple processor designs for increased computing capability.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims. Moreover, while the present disclosure has been described with respect to various embodiments, it is fully expected that the teachings of the present disclosure may be combined in a single embodiment as appropriate. Instead, the scope of the present disclosure is defined by the appended claims.

What is claimed is:

1. An electromagnetic geophysical exploration method comprising:
controlling a transmitter to transmit a waveform in a frequency spectrum during an on-time, the transmitter including first and second turns of wire;
controlling a plurality of switches to direct an electrical signal through the first and second turns of wire, the plurality of switches electrically coupled to the first and second turns of wire; and
controlling a switch of the plurality of switches to direct a first transient current in the first turn of wire in an opposite direction from a direction of a second transient current in the second turn of wire, during an off-time, so that electromagnetic fields caused by the first and second transient currents cancel each other out.

2. The method of claim 1, wherein controlling the switch of the plurality of switches includes reversing the polarity of the first transient current in the first turn of wire.

3. The method of claim 1, wherein the plurality of switches are configured to direct the electrical signal in a series loop configuration.

4. The method of claim 1, wherein the plurality of switches are configured to direct the electrical signal in a parallel loop configuration.

5. The method of claim 4, further comprising reconfiguring the plurality of switches to direct the electrical signal in a series loop configuration from a parallel loop configuration.

6. The method of claim 3, further comprising reconfiguring the plurality of switches to direct the electrical signal in a parallel loop configuration from a series loop configuration.

7. The method of claim 1, wherein at least one of the plurality of switches comprises a bi-directional switch.

8. An electromagnetic geophysical exploration system comprising:
a transmitter including first and second turns of wire;
a plurality of switches electrically coupled to the first and second turns of wire;
a control system configured to:

control the transmitter to transmit a waveform in a frequency spectrum during an on-time;

control the plurality of switches to direct an electrical signal through the first and second turns of wire; and control a switch of the plurality of switches to direct a first transient current in the first turn of wire in an opposite direction from a direction of a second transient current in the second turn of wire, during an off-time, so that electromagnetic fields caused by the first and second transient currents cancel each other out.

9. The system of claim 8, wherein controlling the switch of the plurality of switches includes reversing the polarity of the first transient current in the first turn of wire.

10. The system of claim 8, wherein the plurality of switches are configured to direct the electrical signal in a series loop configuration.

11. The system of claim 8, wherein the plurality of switches are configured to direct the electrical signal in a parallel loop configuration.

12. The system of claim 11, wherein the control system is further configured to reconfigure the plurality of switches to direct the electrical signal in a series loop configuration from a parallel loop configuration.

13. The system of claim 10, wherein the control system is further configured to reconfigure the plurality of switches to direct the electrical signal in a parallel loop configuration from a series loop configuration.

14. The system of claim 8, wherein at least one of the plurality of switches comprises a bi-directional switch.

\* \* \* \* \*